US008814442B2

(12) United States Patent
Chen et al.

(10) Patent No.: US 8,814,442 B2
(45) Date of Patent: Aug. 26, 2014

(54) HARDENED MULTIPORT OPTICAL CONNECTOR ASSEMBLY

(75) Inventors: David Zhi Chen, Richardson, TX (US); George N. Bell, Stormville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 164 days.

(21) Appl. No.: 13/413,735

(22) Filed: Mar. 7, 2012

(65) Prior Publication Data
US 2013/0236139 A1 Sep. 12, 2013

(51) Int. Cl.
*G02B 6/38* (2006.01)
*G02B 6/40* (2006.01)

(52) U.S. Cl.
USPC ............... 385/59; 385/54; 385/57; 385/60

(58) Field of Classification Search
USPC .......................... 385/54, 57, 59, 60
See application file for complete search history.

(56) References Cited

U.S. PATENT DOCUMENTS

| | | | | |
|---|---|---|---|---|
| 4,124,272 A * | 11/1978 | Henderson et al. | ............. | 385/26 |
| 4,140,367 A * | 2/1979 | Makuch et al. | ................ | 385/59 |
| 4,277,135 A * | 7/1981 | Schrott et al. | .................... | 385/75 |
| 4,641,915 A * | 2/1987 | Asakawa et al. | ................ | 385/26 |
| 4,854,664 A * | 8/1989 | McCartney | ...................... | 385/59 |
| 5,066,094 A * | 11/1991 | Takahashi | ........................ | 385/73 |
| 5,337,384 A * | 8/1994 | Basavanhally et al. | ......... | 385/54 |
| 5,608,828 A * | 3/1997 | Coutts et al. | .................... | 385/59 |
| 5,717,800 A * | 2/1998 | Funabashi | ....................... | 385/49 |
| 5,778,121 A * | 7/1998 | Hyzin | ............................. | 385/55 |
| 5,796,896 A * | 8/1998 | Lee | ................................ | 385/59 |
| 6,048,102 A * | 4/2000 | Fukushima | ..................... | 385/72 |
| 6,217,229 B1 * | 4/2001 | Arab-Sadeghabadi et al. | . | 385/60 |
| 6,394,661 B1 * | 5/2002 | Cull et al. | ....................... | 385/59 |
| 6,527,452 B1 * | 3/2003 | Sejourne | ......................... | 385/60 |
| 7,118,287 B2 * | 10/2006 | Perry et al. | ..................... | 385/60 |
| 7,156,560 B2 * | 1/2007 | Seeley | ............................. | 385/59 |
| 7,481,584 B2 * | 1/2009 | Cairns | ............................. | 385/60 |
| 2003/0007739 A1 * | 1/2003 | Perry et al. | ..................... | 385/60 |
| 2006/0257076 A1 * | 11/2006 | Seeley | ............................. | 385/60 |
| 2013/0236139 A1 * | 9/2013 | Chen et al. | ..................... | 385/60 |

* cited by examiner

*Primary Examiner* — Rhonda Peace

(57) ABSTRACT

A multiport optical connector assembly (MOCA) includes an insertion optical fiber assembly having an insertion assembly housing and a connector disk that includes a first connector element having a first ferrule and a first optical fiber. The MOCA further includes a coupling optical fiber assembly having a second connector element including a second ferrule and a second optical fiber. The MOCA further includes an adapter assembly that includes an adapter assembly housing a docking unit for docking the first connector element and the second connector element when the MOCA is assembled. When the first connector element and the second connector element are docked, a tip of the first optical fiber and a tip of the second optical fiber abut one another and the first optical fiber and the second optical fiber form an optical path.

18 Claims, 9 Drawing Sheets

HARDENED MULTIPORT OPTICAL CONNECTOR ASSEMBLY

BACKGROUND INFORMATION

Typical multi-fiber push-on (MPO)/mechanical transfer push-on (MTP) optical connectors are designed to provide high density optical connections. For example, a MPO/MTP connector may simultaneously connect a set of 12 optical fibers to another set of 12 optical fibers. However, MPO/MTP connectors may introduce high insertion/return loss and non-uniformity in optical paths that include the connectors. Furthermore, a typical MPO/MTP connector may be physically less durable than a typical single-fiber connector.

DETAILED DESCRIPTION OF PREFERRED EMBODIMENTS

The following detailed description refers to the accompanying drawings. The same reference numbers in different drawings may identify the same or similar elements.

As described below, a multiport optical connector assembly (MOCA) may connect optical fibers, allowing optical signals to traverse the connections with less insertion loss, less return loss, and better uniformity over multiple optical fibers than a ribbon multi-fiber push-on (MPO)/mechanical transfer push-on (MTP) connector. A MOCA may have less insertion/return loss than a typical MPO/MTP, because: each end face of connector elements in a MOCA can be finished to be in much higher quality than the end face of a ribbon MPOMTP connector, and each optical fiber-to-fiber connection is individually aligned. Each end face of connector elements in a MOCA can be made in a symmetric geometry, such as angle-polished contact (APC) or ultra polished contact (UPC); each connector element in a MOCA behaves more like a single-fiber optical connector and is less impacted by a group geometry of optical fibers in a MPO/MTP connector; axial force on each connection is better controlled than axial force on individual fibers in a MPT/MTP connector; each connector element in a MOCA can be cleaned independently from other connector elements in the MOCA; and a MOCA can seal the connections in a water-tight housing, allowing the MOCA to be buried underground or placed in water. A MOCA has a rounded housing that is rotationally symmetric about its axis. Such geometry of the housing provides for increased resistance against water-pressure. A MOCA may connect more than 12 pairs of optical fibers (e.g., 12, 16, 18, 24, 32, 48, 64, 72, etc.).

In many optical networks, the distances spanned by optical fiber cables that carry signals from a central office to access points or customer premises may be large. Because factory-made optical fiber cable lengths are preset at particular values, fiber optic connectors and/or connector assemblies are needed to adjoin the optical fiber cables of different lengths for the optical fiber cables to cover the distances.

In an optical network that supports 10 Gigabit Ethernet (GbE), a single optical fiber may link two network nodes. In such a network, each optical fiber connector may adjoin or connect a single optical fiber to another single optical fiber. In an optical network that supports a higher bandwidth (e.g., 40 GbE, 100 GbE, etc.), multiple, parallel optical fibers may link two network nodes. In such a network, multi-fiber optical connectors (e.g., MOCA, MPO/MTP connector, etc.) may be used to connect one set of parallel optical fibers to another set of parallel optical fibers.

Figure 1:
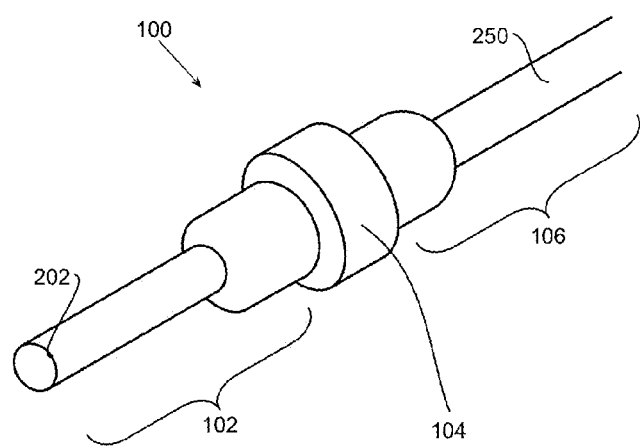
FIG. 1 is a perspective view of an exemplary multiport optical connector assembly (MOCA) according to one embodiment.
Figure 2:
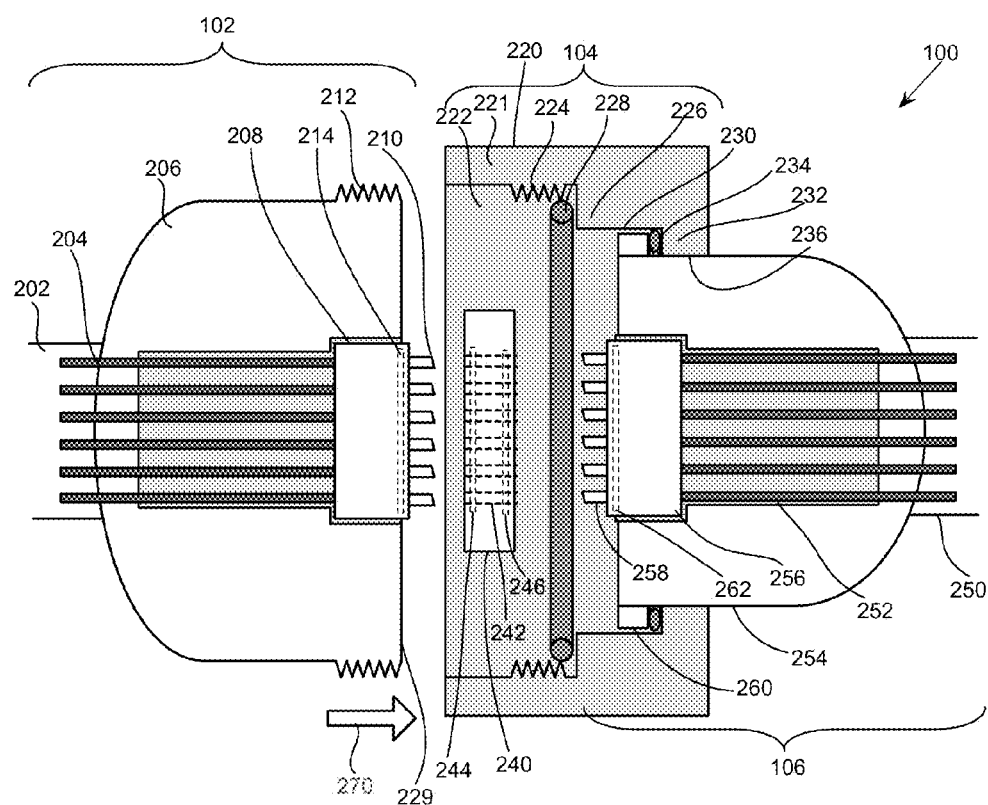
FIG. 2 is a cross-sectional side view of the MOCA of FIG. 1.

FIG. 1 and FIG. 2 are a perspective view and a cross-sectional side view of a MOCA 100, respectively. As shown, MOCA 100 may include an insertion optical fiber assembly 102, an adapter assembly 104, and a coupling optical fiber assembly 106. Depending on the implementation, MOCA 100 may include additional, fewer, different, or a different arrangement of components than those illustrated in FIGS. 1 and 2.

Insertion optical fiber assembly 102 may retain a set of optical fiber ends that are to be adjoined/coupled to another set of optical fiber ends retained by coupling optical fiber assembly 106. Adapter assembly 104 may affix insertion optical fiber assembly 102 to coupling optical fiber assembly 106 when adapter assembly 104 is completely screwed onto insertion optical fiber assembly 102, with coupling optical fiber assembly 106 placed inside adapter assembly. Coupling optical fiber assembly 106 may retain a set of optical fiber ends that are to be adjoined/coupled to another set of optical fiber ends retained by insertion optical fiber assembly 102.

As further shown in FIG. 2, insertion optical fiber assembly 102 may include a cable 202, optical fibers 204, an insertion assembly housing 206, a connector disk 208, and optical connector elements 210. In FIG. 2, only one of optical fibers 204 and only one of connector elements 210 are labeled for simplicity. Depending on the implementation, insertion assembly 102 may include additional, fewer, different, or a different arrangement of components than those illustrated in FIG. 2. For example, insertion optical fiber assembly 102 may include additional or fewer optical fibers 204 and optical connector elements 210.

Cable 202 may wrap/bundle and protect optical fibers 204. Optical fiber 204 may run from one optical device to the inside of insertion assembly housing 206 and terminate at optical connector element 210. Insertion assembly housing 206 may include connector disk 208 and optical fibers 204 that run through cable 202 to optical connector elements 210 that are inserted in and held by connector disk 208. Part of the outer surface of insertion assembly housing 206 includes a threaded portion 212, which may match a threaded portion of the internal wall of adapter assembly 104 when insertion assembly housing 206 is inserted in adapter assembly 104.

Connector disk 208 may include magnet(s) 214 and a component for holding optical connector elements 210. Magnet(s) 214 may be inside, near, or on the face of connector disk 208, that is oriented to contact a face of connector docking unit 240 (described below).

Optical connector element 210 may include one or more components of a fiber optic connector, such as a ferrule, optical fiber, etc. Optical connector element 210 may hold an end of optical fiber 204 in position for connecting the end to an end of another optical fiber during assembly of insertion optical fiber assembly 102, adapter assembly 104, and coupling optical fiber assembly 106 into MOCA 100. FIG. 2 shows the tip of optical connector element 210. Optical connector element 210 is described below in greater detail with reference to FIGS. 4A-4C.

As further shown in FIG. 2, adapter assembly 104 includes adapter housing 220 and connector docking unit 240. Adapter housing 220 includes a wall 221 that forms a cylindrical cavity 222 with an opening through which adapter housing 220 may receive insertion assembly housing 206 into cavity 222. The interior surface of wall 221 may include threaded portion 224, which may match threaded portion 212 of insertion assembly housing 206 when insertion assembly housing 206 is fitted into cavity 222 and adapter housing 220 is turned (relative to insertion assembly housing 206) to pull insertion assembly housing in the direction of arrow 270.

Adapter housing 220 also includes annular shoulder 226 that is perpendicular to wall 221. Rubber ring/seal 228 may be placed on a flat (perpendicular to an axis running through the cylindrical cavity 222) of annular shoulder 226. When adapter housing 220 is screwed onto insertion assembly housing 206 and insertion assembly housing 206 applies pressure on rubber ring/seal 228, rubber ring/seal 228 may form a moisture-proof/water-right seal between a front surface 229 of insertion assembly housing 206 and annular shoulder 226 of adapter housing 220.

Annular shoulder 226 includes inner wall 230 that is perpendicular to the flat of annular shoulder 226. Inner wall 230 surrounds a cylindrical space that is contiguous to and whose radius is narrower than that of cavity 222. Jutting inwardly from inner wall 230 is a second annular shoulder 232. Rubber ring/seal 234 may be placed on a flat (perpendicular to an axis running through cylindrical cavity 222) of second annular shoulder 232. Second annular shoulder 232 includes a second inner wall 234 that is perpendicular to the flat of second annular shoulder 232, and surrounds yet another cylindrical space within adapter housing 220.

Connector docking unit 240 may include ferrule sleeve(s) 242 and magnets 244 and 246. In FIG. 2, only one ferrule sleeve 242 is labeled for simplicity. Ferrule sleeve 242 may provide a hole (perpendicular to a surface of connector docking unit 240) for receiving optical connector element 210 of connector disk 208 from one side of ferrule sleeve 242, and for receiving another optical connector element from the other side ferrule sleeve 242. When MOCA 100 is assembled, optical connector element 210 and the other optical connector element may abut one another in ferrule sleeve 242 and form an optical path.

Magnet(s) 244 may be inside, near, or on the face of connector docking unit 240, that is oriented to contact the face of connector disk 208. When connector docking unit 240 is docked onto the face of connector disk 208, magnet 244 may exert a pull on the surface of connector disk 208 such that connector disk 208 and docking unit 240 are tightly and stably coupled. Similarly, magnet(s) 246 may be inside, near, or on the other face/surface of connector docking unit 240, that is oriented to contact the face of a connector disk 256 (described below). When connector docking unit 240 is docked onto the face of connector disk 256, magnet 246 may exert a pull on the surface of connector disk 256 such that connector disk 256 and docking unit 240 are tightly and stably coupled.

In some implementations, one or more of connector disk 208, docking unit 240, and connector disk 256 may not include a magnet. For example, in one implementation, connector disks 208 and 256 may include magnets 214 and 262, respectively, and docking unit 240 may not include magnets 244 and 246. In a different implementation, only docking unit 240 may include magnets 244 and 246. When each of connector disk 208/256 and docking unit 240 includes a magnet, the magnets would have opposite polarities (e.g., south and north).

As further shown in FIG. 2, coupling optical fiber assembly 106 may include a cable 250, optical fibers 252, a coupling assembly housing 254, connector disk 256, and an optical connector element 258. In FIG. 2, only one of optical fibers 252 and only one of connector elements 258 are labeled for simplicity. Depending on the implementation, coupling optical fiber assembly 106 may include additional, fewer, different, or a different arrangement of components than those illustrated in FIG. 2. For example, coupling optical fiber assembly 106 may include additional or fewer optical fibers 252 and optical connector elements 258.

Cable 250 may wrap/bundle and protect optical fibers 252. Optical fiber 252 may run from one optical device to the inside of coupling assembly housing 254 and terminate at optical connector element 258. Coupling assembly housing 254 may include connector disk 256 and optical fibers 252 that run through cable 250 to optical connector elements 258 that are inserted in and held by connector disk 256. Connector disk 256 may include magnet(s) 262 and a component for holding optical connector elements 258. Magnet(s) 262 may be inside, near, or on the face of connector disk 256, that is oriented to contact a face of connector docking unit 240.

Optical connector element 258 may include one or more components of a fiber optic connector, such as a ferrule, optical fiber, etc. Optical connector element 258 may hold an end of optical fiber 252 in position for connecting the end to an end of another optical fiber during assembly of insertion optical fiber assembly 102, adapter assembly 104, and coupling optical fiber assembly 106 into MOCA 100. FIG. 2 shows the tip of optical connector element 258. Optical connector element 258 is described below in greater detail with reference to FIGS. 4A-4C.

Stop piece 260 forms an annular ring around the outer surface of coupling assembly housing 254. Stop piece 260 may be integrally formed with coupling assembly housing 254 or fixedly attached to housing 254.

To connect multiple optical fibers 204 in cable 202 to optical fibers 252 in cable 250, insertion optical fiber assembly 102, adapter assembly 104, and coupling optical fiber assembly 106 are brought together, with ferrule sleeves 242 of docking unit 240 fitting into connector elements of both connector disk 208 and connector disk 256. With magnets 214, 244, 246, and 262 holding connector disk 208, docking unit 240, and connector disk 256 attached to one another, adapter housing 220 can be slid over insertion assembly housing 206.

To secure the connection, adapter housing 220 can be turned to mesh threaded portion 212 of insertion assembly housing 206 to threaded portion 224 of adapter housing 220. Because coupling optical fiber assembly 106 is not affixed to adapter housing 220, adapter housing 220 can be turned without rotating coupling optical fiber assembly 106 therewith. This ensures that cable 250 or cable 202 does not become overtly twisted and damage optical fibers therein.

As insertion assembly housing 206 advances in the direction of arrow 270 relative to coupling assembly housing 254, front surface 229 of insertion assembly housing 206 abuts and flattens rubber ring/seal 228, forming a water-tight/moisture-proof seal between adapter housing 220 and insertion assembly housing 206. At the same time, connector disk 208 pushes against docking unit 240, which transfers the force from connector disk 208 to connector disk 256 and coupling assembly housing 254. As coupling assembly housing 254 moves in the direction of arrow 260, stop piece 260 pushes against second rubber ring/seal 234. Consequently, second rubber seal/ring 234 becomes squeezed between the flat of second shoulder 232 and stop piece 260 and forms a water-tight/moisture-proof seal between coupling assembly housing 254 and adapter housing 220. Once adapter housing 220 is tight against insertion assembly housing 206, MOCA 100 is water-tight/moisture-proof, and optical fibers 204 that terminate at connector elements 210 in connector disk 208 are in contact with optical fibers 252 that terminate in connector elements 258 in connector disk 256. As shown in FIGS. 1 and 2, MOCA 100 is rotationally symmetric about an axis parallel to arrow 270. The symmetry aids in distributing/disperse external pressure (e.g., water pressure) evenly about the body of MOCA 100, and aids in keeping MOCA 100 water-tight/moisture-proof.

Figure 3:
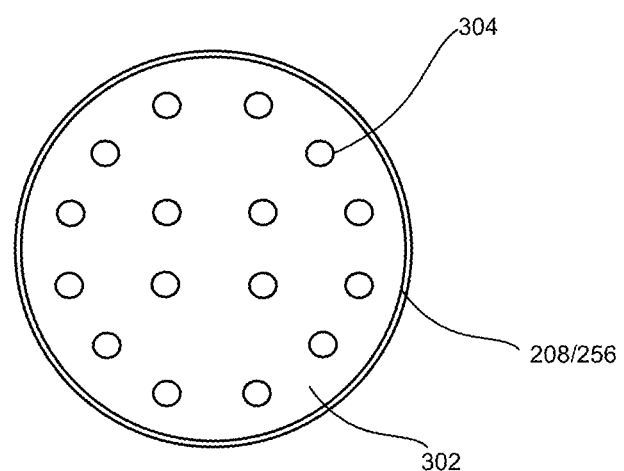
FIG. 3 is a view of the face of an exemplary connector disk of FIG. 2.

FIG. 3 is a view of the face of connector disk 208/256 in an unassembled configuration. As shown, connector disk 208/256 includes a matrix 302 and one or more holes 304. Matrix 302 may hold connector elements 210/258 in place. Hole 304 may provide space into which the ferrule of connector element 210/258 may be inserted.

Figure 4A:
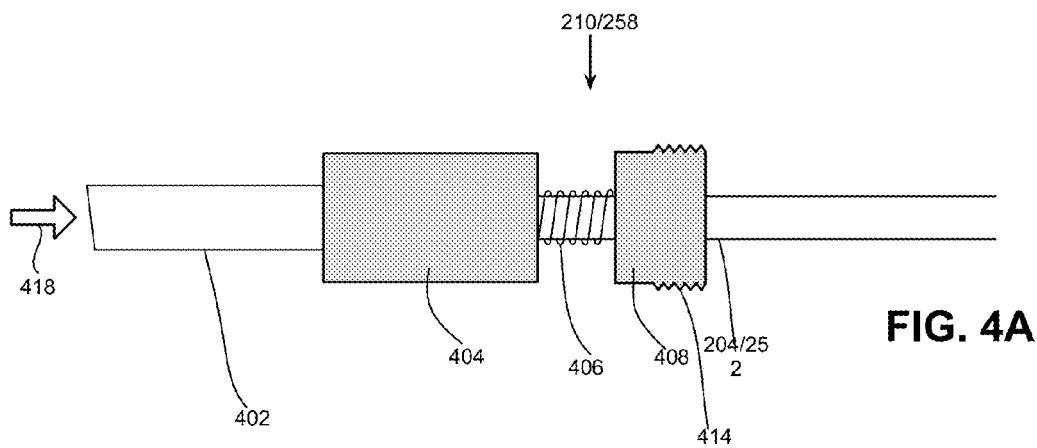
FIG. 4A is a side view of an exemplary optical connector element of FIG. 2.
Figure 4B:
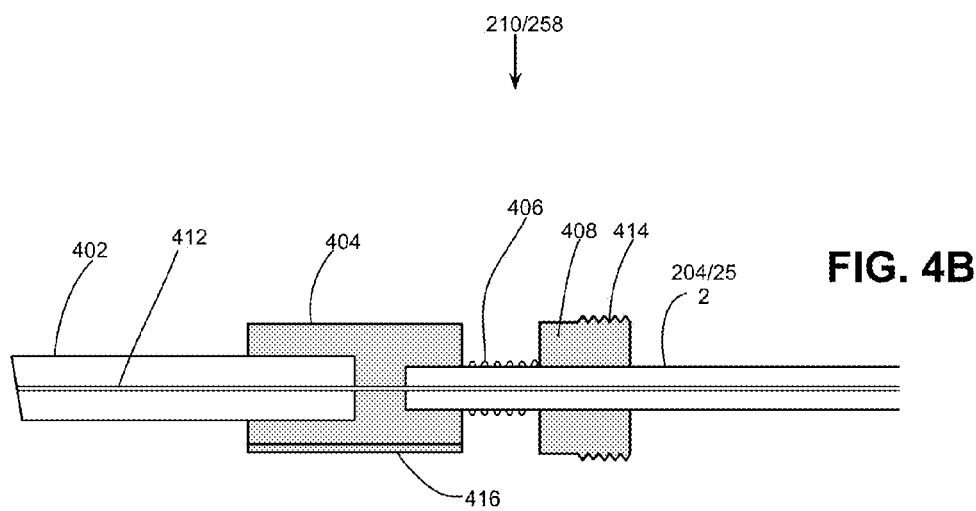
FIG. 4B is a cross-sectional side view of the optical connector element of FIG. 4A.
Figure 4C:
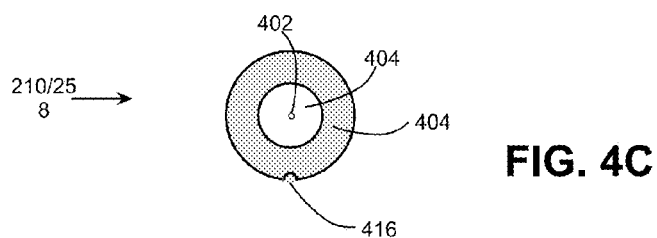
FIG. 4C is a cross-sectional front view of the optical connector element of FIG. 4A.

FIGS. 4A, 4B, and 4C are a side view, a cross-sectional side view, and a cross-sectional front view of optical connector element 210/258. As shown in FIGS. 4A and 4B, connector element 210/258 may include ferrule 402, ferrule base 404, spring 406, ferrule locker 408, optical fiber 204/252 (with a sheath or a cover), and optical fiber 412 (without the sheath/cover). Depending on the implementation, optical connector element 210/258 may include additional, fewer, different, or a different arrangement of components than those illustrated in FIG. 4A.

Ferrule 402 may include a plug that holds an end of optical fiber 412. Ferrule 402 aligns the end of optical fiber 412 for connector element 210. This allows the end of optical fiber 412 to be aligned to and abut the end of another optical fiber of a complementary connector element via docking unit 240. During the construction of connector element 210/258, optical fiber 412 from optical fiber 204/252 may be inserted into ferrule 402 and affixed (e.g., using epoxy) thereto. As shown in FIG. 4B, the end of optical fiber 412 is exposed at the end of ferrule 402.

Ferrule base 404 may fixedly retain/hold ferrule 402. Although FIG. 4B shows optical fiber 204/252 as partly inside ferrule locker 404, optical fiber 204/252 may not be affixed to ferrule locker 408, and ferrule locker 408 may rotate about optical fiber 204/252.

Spring 406 may be wound about optical fiber 204/252 and positioned between ferrule base 404 and ferrule locker 408. Because ferrule locker 408 is not affixed to optical fiber 204/252, when a force is applied at the tip of ferrule 402 in the direction of arrow 418 via another ferrule/optical fiber, ferrule base 404 (and therefore, ferrule 402 as well) pushes against spring 406, narrowing the distance between ferrule base 404 and ferrule locker 408, provided that ferrule locker 408 is held stationary. This causes optical fiber 204/252 to slide in the direction of arrow 418 relative to ferrule locker 408. In this state of tension, spring 406 maintains a constant force against ferrule base 404, which in turn, maintains a relatively constant force on ferrule 402 and optical fiber 412 against the other ferrule/optical fiber. Therefore, spring 206 ensures that no excessive force is applied against the tip of optical fiber 412 and ferrule 402.

Figure 5:
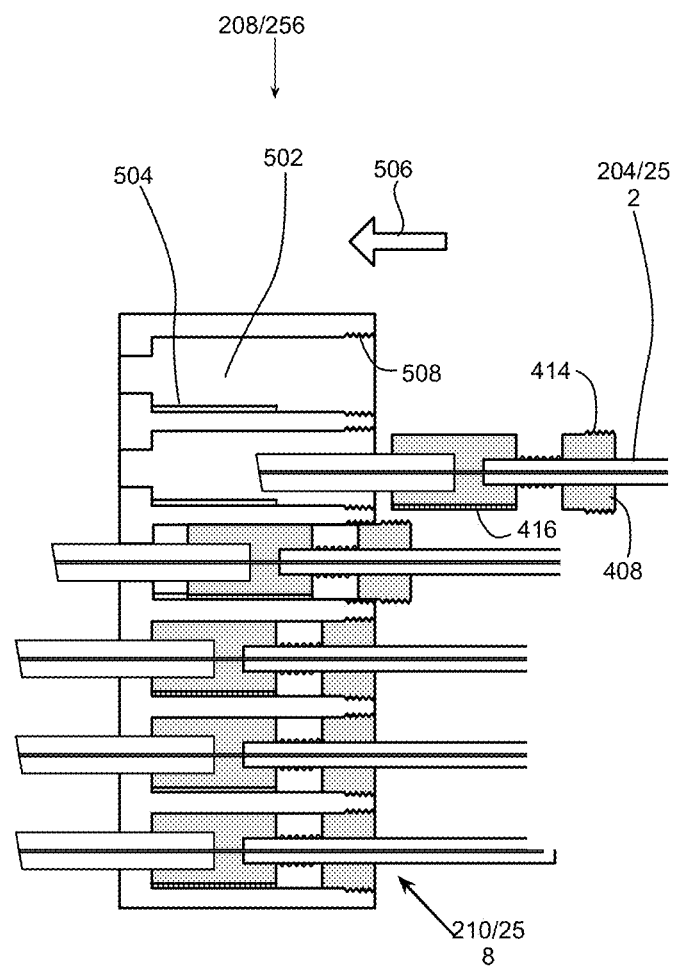
FIG. 5 is a cross-sectional side view of the connector disk of FIG. 3 when optical connector elements of FIG. 3 are being inserted therein.

Ferrule locker 408 is used, after connector element 210/258 is inserted in connector disk 208/256, to lock connector element 210/258 to connector disk 208/256. FIG. 5 is a cross-sectional side view of the connector disk 208/256 when optical connector elements 210/258 are being inserted therein. FIG. 5 also illustrates different stages of the insertion of a connector element into connector disk 208/256.

As shown in FIG. 5, connector disk 208/256 includes connector element space 502, into which a connector element may be inserted. The wall of connector disk 208/256 includes a ridge 504. Referring to FIGS. 5, 4B, and 4C, ridge 504 fits into a key 416 of ferrule base 404 provided that key 416 of connector element 210/258 is aligned with ridge 504 when connector element 210/258 is inserted into connector element space 502.

When connector element 210/258 is inserted into connector element space 502 to the extent that threaded portion 414 of ferrule locker 408 is adjacent to threaded portion 508 of the wall, of connector disk 208/256, ferrule locker 408 (which is freely rotatable with respect to cable 410) may be turned to mesh threaded portion 414 to threaded portion 508 of connector disk 256. Ferrule locker 408 may be turned until connector 210/258 is fully inserted (or inserted to a desired extent) into connector element space 502. Thus, ferrule base 408 is "locked" in connector element space 502 via threaded portion 508 of the wall surrounding connector element space 502 and threaded portion 414 of ferrule locker 408.

When MOCSA 100 is assembled, connector elements 210 contact connector elements 258 in ferrule sleeves 242 of docking unit 240. For the end of a connector element 210 to solidly contact the end of a connector element 258, the ends of connector elements 210/258 are free to float within a given tolerance. Toward this end, connector element space 502 and ferrule sleeves 242 have internal diameters that are slightly larger than that of ferrule body 404 of connector elements 210/258 to provide some wriggle room. Small form factor for each connector element 210/258 (e.g., connector element 210 is much smaller than a typical connector) may allow a large number of connector elements 210/258 to be connected in relatively small space, via MOCA 100.

Figure 6A:
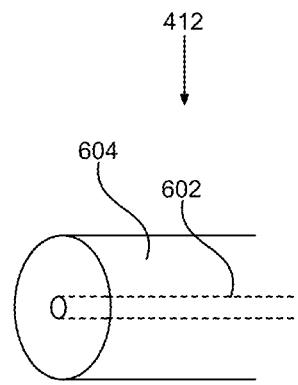
FIGS. 6A and 6B are cross-sectional views of an optical fiber in an optical connector element of FIGS. 2-5 according to different embodiments.
Figure 6B:
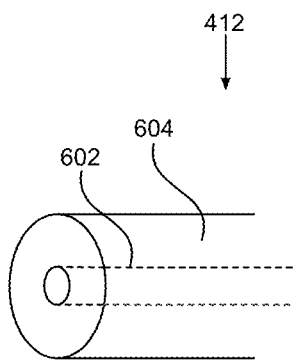

FIGS. 6A and 6B are cross-sectional views of optical fiber 412 in optical connector element 210/258. As shown, optical fiber 412 may include a core 602 and an outer portion 604, referred to as a "cladding 604," that surrounds core 602 and runs lengthwise inside optical fiber 412. The indices of refraction of core 602 and cladding 604 are selected to facilitate or guide a light beam to travel lengthwise in optical fiber 412.

As shown, the diameter of core 602 in FIG. 6B is larger than that of core 602 in FIG. 6A. Whether an optical fiber can operate as a single mode fiber or a multimode fiber may depend on the diameter of core 602. FIG. 6A shows optical fiber 412 implemented as a single mode optical fiber. In one implementation, the diameter of core 602 may be approximately 8 μm. FIG. 6B shows optical fiber 412 implemented as a multimode optical fiber. In some implementations, the diameter of core 602 may range approximately from 7 μm to 3,000 μm (e.g., 50 μm, 60 μm, etc.). In one implementation, the overall diameter of optical fiber 412 in FIGS. 6A and 6B is approximately 125 μm.

Figure 7A:
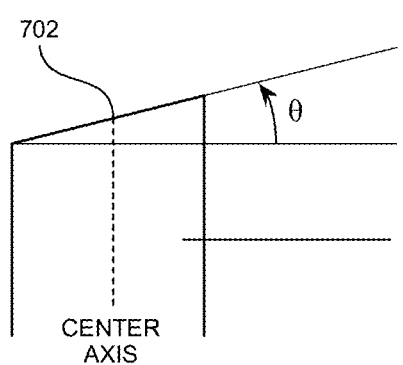
FIGS. 7A and 7B are a side view and a perspective view, respectively, of a ferrule of FIGS. 2, 4, and 5 according to one embodiment.
Figure 7B:
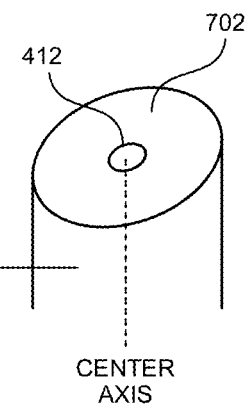

FIGS. 7A and 7B are a side view and a perspective view, respectively, of ferrule 402 and optical fiber 412. In FIGS. 7A and 7B, ferrule 402 includes an angle polished contact (APC) (alternatively, angle physical contact/connector (APC)). As shown, the plane of end face 702 of ferrule 402 forms an angle θ with a plane that is normal to the center axis of ferrule 402. In one implementation, θ is approximately 8 degrees.

In this implementation, when MOCA 100 is assembled, connector disks 208 and 256 are configured so that the tip of a connector element 210 of connector disk 208 and the tip of a corresponding connector element 258 of connector disk 256 contact one another on an ellipse. In this configuration, key 416 of the connector element 210 of connector disk 208 and key 416 of the connector element 258 of connector disk 256 are located at the opposing ends of the transverse diameter of the ellipse.

Figure 7C:
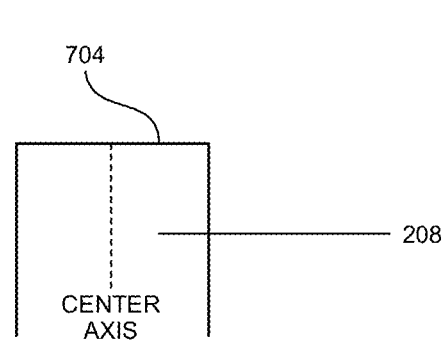
FIGS. 7C and 7D are a side view and a perspective view, respectively, of a ferrule of FIGS. 2, 4, and 5 according to another embodiment.
Figure 7D:
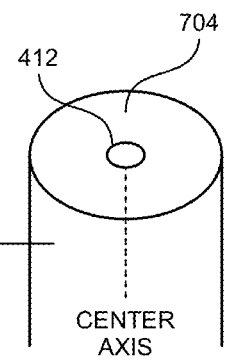

FIGS. 7C and 7D are a side view and a perspective view, respectively, of ferrule 402 and optical fiber 412 according to another implementation. In this implementation, ferrule 402 includes an ultra polished contact (UPC) (alternatively, ultra physical connector (UPC)). As shown, the plane of end face 704 of ferrule 402 is parallel with a plane that is normal to the center axis of ferrule 402.

An APC connector element (e.g., a fiber optic connector element with an optical fiber having an APC) and a UPC connector element (a fiber optic connector element with an optical fiber having a UPC) have different optical properties. For example, in some implementations, an APC connector element and a UPC connector element may have different levels of insertion loss. As used herein, the term "insertion loss" may refer to the amount of optical signal power lost through the insertion of the end faces of connected optical fibers. The insertion loss may be a function of several optical fiber parameters, such as the outside diameter of the optical fiber, concentricity of the fiber cores, inside diameter of ferrule 402, the concentricity of ferrule 402, etc.

In another example, an APC connector element and a UPC connector element may include different levels of return loss. As used herein, the term "return loss" may refer to the amount of optical signal power lost through reflection of the optical signal at the end faces of optical fibers of an attached/mated fiber optic connector pair. For a mated UPC connector element pair, return light, which results from a reflection of a forward moving light at the end faces of the optical fibers, travels straight back at the forward moving light, degrading and cross-modulating with a downstream signal. In contrast, given a mated APC connector element pair, return light from the angled end faces of the optical fibers travels in a direction non-parallel to the direction of the forward moving light. The return light is absorbed by cladding 604. Accordingly, a typical, mated APC connector element pair may incur less return loss than a typical, mated UPC connector element pair (e.g., −65 dB return loss for an APC connector element pair and −55 dB return loss for UPC connector element pair). Similarly, a typical unmated APC connector element (e.g., an APC connector element at an unused port) may incur less return loss than an unmated UPC connector element (e.g., −55 dB return loss for an unmated APC connector element and −14 dB return loss for an unmated UPC connector6 element).

Whether connector element 210/258 is implemented as an APC connector element or a UPC connector element, MOCA 100 allows the face of each connector element 210/258 to be polished individually, to minimize insertion/return loss per fiber basis. In contrast, the end faces of optical fibers in MPO/MTP connectors are polished as an array. Any polishing inaccuracies/defects are likely to be heterogeneous for different optical fibers, and may result in less precise contacts between two sets of optical fibers adjoined by the MPO/MTP connectors, leading to greater insertion/return loss.

Figure 8A:
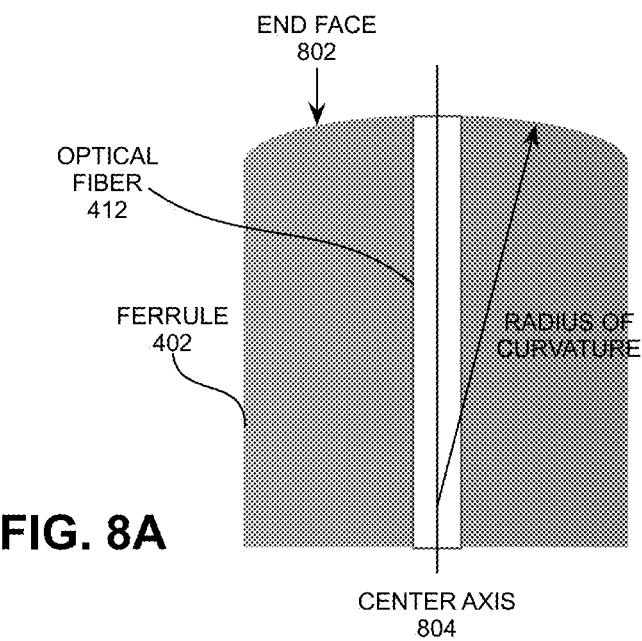
FIG. 8A is a cross-sectional side view of a ferrule of FIGS. 2, 4, and 5 according to another embodiment.

FIG. 8A is a cross-sectional side view of ferrule 402 according to another implementation. In FIG. 8A, ferrule 402 includes an apex cut, to be described below. The side view illustrates the geometry of the end face 802 of apex cut ferrule 402 and optical fiber 412. As shown, end face 802 of ferrule 402 is curved such that the center of optical fiber is near or at the apex of end face 802. End face 802 is circularly symmetric with respect to angles in the plane normal to the center axis 804. As further shown, end face 802 has a radius of curvature measured from center axis 804. As described above, connector element 210/258 may use a compressive force (e.g., by spring) to adjoin connecting ends of optical fibers. The radius of curvature of ferrule 402 affects the pressure that maintains the relative positions of the optical fibers abutting one another. If the radius of curvature is too small (e.g., <7 mm), because the abutting force between the end faces is concentrated in a relatively small contact area, the optical fibers may be prone to damages, cracks, etc. If the radius of curvature of too large (e.g., >25 mm), because the abutting force between the end faces is dispersed over a larger contact area, the optical fibers may easily become misaligned or fail to make sufficient contact with one another, resulting in increased insertion and return loss.

Figure 8B:
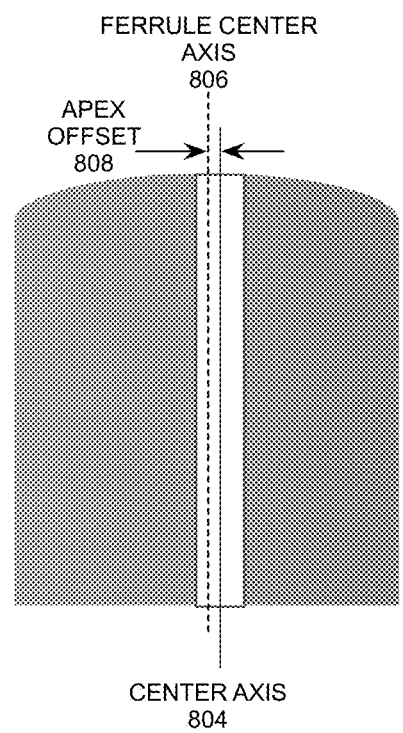
FIG. 8B illustrates an exemplary apex offset of the optical fiber in the ferrule of FIG. 8A.

FIG. 8B illustrates an exemplary apex offset of optical fiber 412. As shown, center axis 804 of optical fiber 412 is offset from center axis 806 of ferrule 402, by an apex offset 808. Apex offset 808 may also be the displacement between the highest point of end face 802 and center axis 804. As apex offset 808 increases (e.g., >50 μm), insertion loss and return loss at the adjoining optical fiber end faces also increase.

Figure 9A:
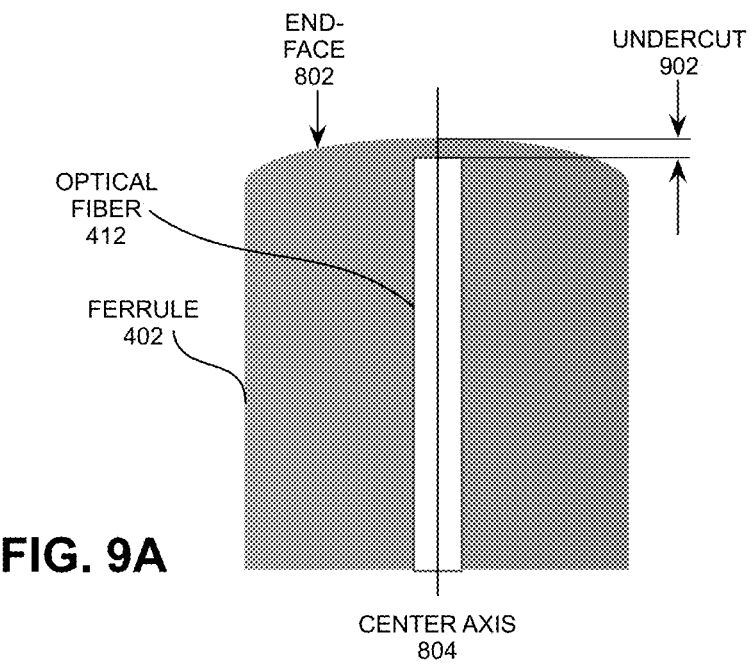
FIG. 9A depicts an exemplary undercut in the optical fiber of FIG. 8A.
Figure 9B:
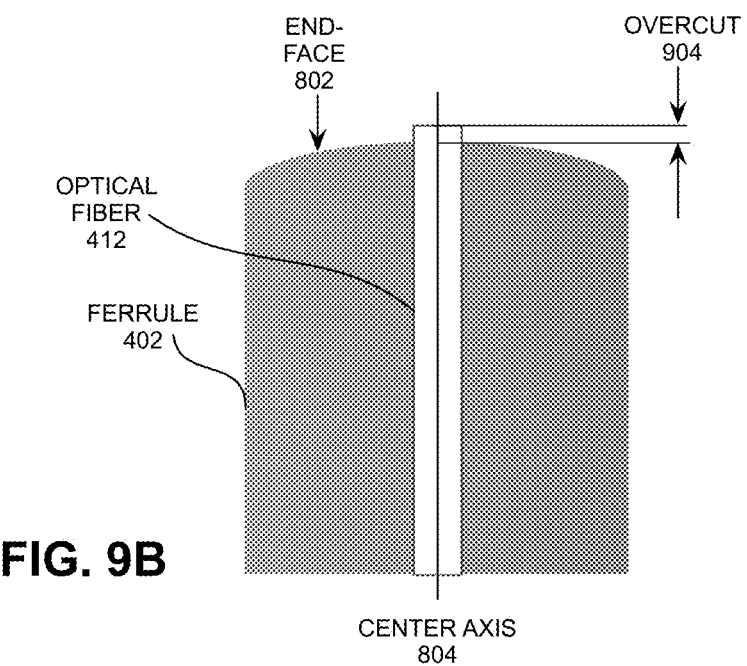
FIG. 9B depicts an exemplary overcut in the optical fiber of FIG. 8A.

FIG. 9A depicts an exemplary undercut in optical fiber 412 relative to ferrule 402. As shown, the surface of optical fiber 412 is below the surface of end face 802 near its apex, by undercut 902 amount. FIG. 9B depicts an exemplary overcut in optical fiber 412 relative to ferrule 402. As shown, the surface of optical fiber 412 is above the surface of end face 802 near the apex, by overcut 904 amount. An appropriate amount of overcut/undercut may ensure that the abutting end faces of optical fibers adjoined via a pair of fiber optic connector elements will be stable. If undercut amount 902 is too large, a gap between optical fibers can result, leading to increased insertion and return losses. If overcut 904 is too large, the optical fiber end may sustain damages due to the force applied by ferrules of the pair of mated connector elements.

As discussed above with reference to FIGS. 7A-9B, each optical fiber end of MOCA 100 can be APC or UPC, having overcut, undercut, and/or offset from the center axis of the optical fiber. For MOCA 100, overcut or undercut may be made smaller than those for a ribbon MPO/MTP connector. More generally, MOCA can be finished to be in much higher quality than the end face of a ribbon MPO/MTP connector, with an "array-finish."

Figure 10:
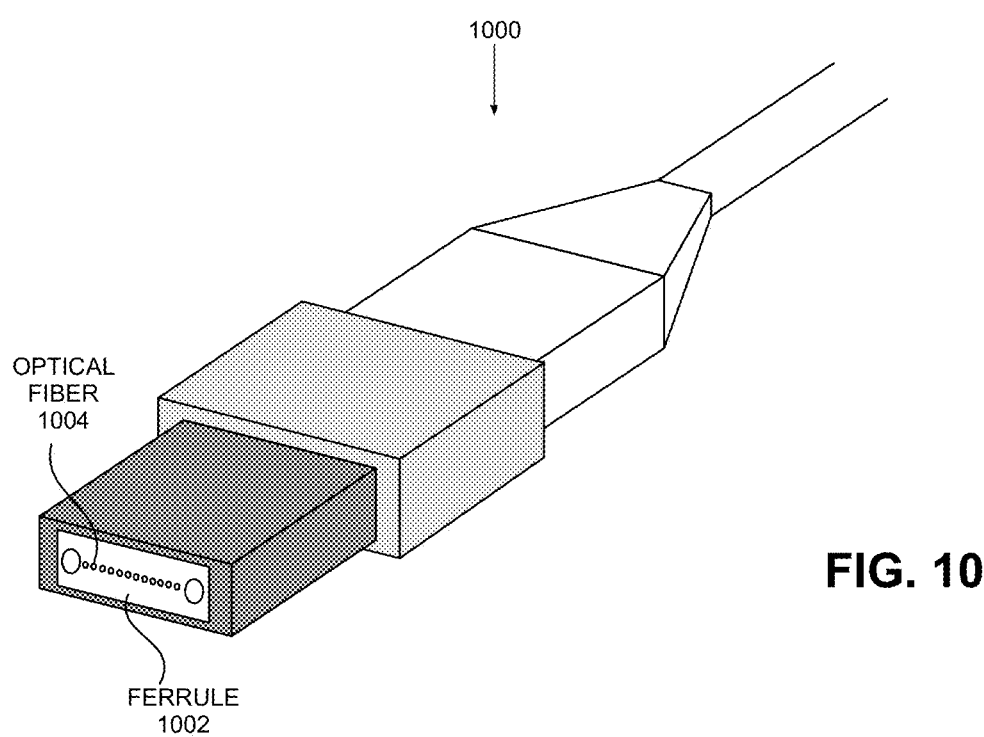
FIG. 10 illustrates an exemplary multi-fiber push-on (MPO)/mechanical transfer push-on (MTP) connector according to one implementation.

FIG. 10 illustrates a typical MTO/MTP connector 1000. As shown, MPO/MTP connector 100 includes ferrule 1002 and one or more optical fibers 1004. As shown, optical fiber 1004 are spaced apart in a relatively small dimension. Consequently, it is difficult to ensure the precision and accuracy of the parameters of the individual optical fibers 1004 of MPO/MTP connector 1000. If parameters of an optical fiber 1004 (e.g., cleanliness, precision of angle-cut, concentricity, overcut, undercut, etc.) of a multi-fiber optical connector deviates from the parameters of other optical fibers of MPO/MTP connector 1000, it is difficult to re-polish or clean the particular optical fiber 1004. Consequently, MPO/MTP connectors 1000 generally incur greater insertion loss and return loss per optical fiber than single fiber optical connectors.

For MOCA 100, because each optical connector element 210/258 of connector disk 208/256 can be handled independently from other optical connector elements 210/256, each end face of connector elements in MOCA 100 can be made in a symmetric geometry, such as the APC or UPC. In addition, because each connector element 210/258 in MOCA 100 behaves more like a single-fiber optical connector, it is less impacted by a group geometry of optical fibers in a MPO/MTP connector. For example, an axial force on each connection is better controlled for MOCAs 100 than axial force on individual fibers in a MPT/MTP. In another example, each connector element in MOCA 100 can be cleaned individually.

As described above, MOCA 100 may accurately connect optical fibers, allowing optical signals to traverse the connections with minimal insertion loss, less return loss, and better uniformity over multiple optical fibers than a ribbon MPO/MTP connector. In addition, MOCA 100 may seal the connections in water-tight housing. The rotational symmetry of MOCA 100's housing aids in water-proofing the connectors. Consequently, MOCA 100 may be used underwater, as well as in various wet environmental conditions. MOCA 100 may connect more than 12 pairs of optical fibers (e.g., 12, 16, 18, 24, 32, 48, 64, 72, etc.).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
   an insertion optical fiber assembly comprising:
      an insertion assembly housing that includes a first threaded portion on an exterior of the insertion assembly housing, and
      a first connector disk that includes at least two first connector elements, wherein each of the first connector elements comprises a first ferrule and a first optical fiber;
   a coupling optical fiber assembly comprising:
      a coupling assembly housing, and
      a second connector disk that includes least two second connector elements, wherein each of the second connector elements comprises a second ferrule and a second optical fiber; and
   an adapter assembly, comprising:
      an adapter assembly housing that includes an interior wall with a second threaded portion; and
      a docking unit for docking the first connector element to the second connector element when the insertion optical fiber assembly, the coupling optical fiber assembly, and the adapter assembly are assembled into a multiport optical connector assembly (MOCA),
   wherein when the first connector element and the second connector element are docked, a tip of the first optical fiber and a tip of the second optical fiber abut one another and the first optical fiber and the second optical fiber form an optical path, and
   wherein when the MOCA is assembled, the insertion assembly housing is inserted into the adapter assembly housing and the adapter assembly housing is turned relative to the insertion assembly housing to fit the first threaded portion to the second threaded portion.

2. The system of claim 1, wherein the first ferrule and the first optical fiber include a first angle-polished cut (APC) end face and the second ferrule and the second optical fiber include a second APC end face, and
   wherein when the MOCA is assembled, the first APC end face and the second APC end face abut one another at an ellipse.

3. The system of claim 1, wherein the adapter assembly housing is rotatable relative to the insertion assembly housing and coupling housing assembly when the MOCA is assembled.

4. The system of claim 1, wherein the adapter assembly includes a first rubber ring between the insertion assembly housing and an interior portion of the adapter assembly housing, and
   wherein, when the MOCA is assembled, the first rubber ring forms a moisture-proof seal between the insertion assembly housing and the adapter assembly housing.

5. The system of claim 1, wherein the adapter assembly includes a second rubber ring between the coupling assembly housing and an interior portion the adapter assembly housing, and
   wherein, when the MOCA is assembled, the second rubber ring forms a moisture-proof seal between the coupling assembly housing and the adapter assembly housing.

6. The system of claim 1, wherein the first connector disk includes a first magnet and the docking unit includes a second magnet with a pole opposite to that of the first magnet, and
   wherein, when first connector element and the second connector element are docked at the docking unit, the first connector disk and the second connector disk are coupled via the first magnet and the second magnet.

7. The system of claim 1, wherein the docking unit includes ferrule sleeves into which the first connector element and the second connector element are inserted when the MOCA is assembled.

8. The system of claim 1, wherein the first connector disk has two or more holes for inserting at least two of the first connector element therein.

9. The system of claim 8, wherein each of the holes of the first connector disk includes a ridge that fits a key on the first connector element when the first connector element is inserted into the hole at a particular orientation.

10. The system of claim 9, wherein the first connector element further comprises:
   a ferrule body affixed to the first ferrule;
   a ferrule locker;
   a spring between the ferrule body and the ferrule locker, wherein, when the first ferrule abuts the second ferrule via the docking unit, the spring pushes the ferrule body to cause a tip, of the first optical fiber in the first ferrule, to apply a pressure on the tip, of the second optical fiber in the second ferrule.

11. The system of claim 10, wherein the ferrule locker includes: a third threaded portion and each of the holes includes a fourth threaded portion, wherein, when the first ferrule is inserted into one of the holes, turning the ferrule locker meshes the third threaded portion to the fourth threaded portion.

12. The system of claim 10, wherein the ferrule locker is rotatable about the first optical fiber without twisting or turning the first optical fiber.

13. A multiport optical connector assembly (MOCA), comprising:

an insertion optical fiber assembly having an insertion assembly housing and a connector disk that includes a first connector element comprising a first ferrule and a first optical fiber;

a coupling optical fiber assembly having a second connector element comprising a second ferrule and a second optical fiber; and an adapter assembly, comprising:
an adapter assembly housing;
a first ring between the insertion assembly housing and an interior portion of the adapter assembly housing; and
a docking unit for docking the first connector element and the second connector element when the MOCA is assembled, wherein when the first connector element and the second connector element are docked, a tip of the first optical fiber and a tip of the second optical fiber abut one another and the first optical fiber and the second optical fiber form an optical path, and wherein when the MOCA is assembled, the first ring forms a moisture-proof seal between the insertion assembly housing and the adapter assembly housing.

14. The MOCA of claim 13, wherein the adapter assembly housing includes an interior wall with a first threaded portion, wherein the insertion assembly housing includes a second threaded portion on an exterior of the insertion assembly housing, and wherein when the insertion assembly housing is inserted into the adapter assembly housing and the adapter assembly is turned relative to the insertion assembly housing, the first threaded portion meshes with the second threaded portion.

15. The MOCA of claim 13, wherein the adapter assembly housing is rotatable relative to the coupling optical fiber assembly.

16. A first connector element comprising:
a ferrule;
an optical fiber cable including a first optical fiber;
a ferrule body affixed to the ferrule and the optical fiber cable, the ferrule body having a protrusion, on a surface of the ferrule body, that extends in an axial direction along a length of the ferrule body; and
a ferrule locker with a hole through which the optical fiber cable runs, wherein when the first connector element is inserted into a hole in a connector disk of a multiport optical connector assembly (MOCA), the first connector element is at a particular orientation with respect to the hole in the connector to fit the protrusion inside a groove, on an interior surface of the hole, that extends parallel to the axial direction, and wherein when the MOCA is assembled, the first optical fiber forms an optical path with a second optical fiber of a second connector element abutting the first connector element.

17. The first connector element of claim 16, wherein the first connector element further comprises:
a spring between the ferrule body and the ferrule locker,
wherein when the MOCA is assembled, the spring provides for a tip of the first optical fiber to maintain a constant pressure on a tip of the second optical fiber.

18. The first connector element of claim 16, wherein the ferrule locker includes a threaded exterior that meshes with a threaded portion in an interior of the hole to lock the first connector element in the connector disk when MOCA is assembled.

* * * * *